United States Patent Office 3,565,661
Patented Feb. 23, 1971

3,565,661
FLOOR COVERINGS AND THE LIKE
Alan Morley Harrison, Welwyn, England, assignor to Welwyn Plastics (1955) Limited, Welwyn, England, a British company
No Drawing. Filed June 14, 1968, Ser. No. 736,953
Claims priority, application Great Britain, Jan. 12, 1968, 1,918/68
Int. Cl. B44c 1/20, 1/22
U.S. Cl. 117—9     6 Claims

ABSTRACT OF THE DISCLOSURE

An improved floor covering and a process for making the same. A base material in sheet form having a coating of a thermoplastic material such as polyvinyl chloride impregnated with an abrasive substance in grit form. A second coating of a thermoplastic material is preferably applied over the first coating also containing an abrasive in grit form to which silicon carbide is sprinkled thereover. The tread surface of the floor covering is embossed to provide small indentations therein.

---

This invention relates to floor coverings comprising a base material in sheet form to which has been applied at least one coating of thermoplastic material. The invention further relates to methods of manufacturing such a floor covering.

Broadly stated the present invention provides a floor covering material comprising a base material in sheet form to which has been applied at least one coating of thermoplastic material impregnated with at least one abrasive substance in small particle or grit form, the tread surface of the covering being embossed so as to have small indentations therein.

Such a floor covering has been found to have good hard wearing properties while exhibiting high anti-skid properties, even when wetted with water or other liquids. If the surface indentations have a depth which is 0.10 mm. to 0.30 mm. thick and if the maximum width of each indentation is at least equal to and preferably four to five times greater than its depth the covering is reasonably easily cleaned. An excellent combination of properties is achieved if the depth of the indentations is some 0.15 mm. to 0.20 mm. the impregnated thermoplastic coating in turn having a thickness of between 2.5 mm. and 4.5 mm.

The base material in sheet form may be woven cotton fabric, felt, paper, metal foil, woven fibreglass or synthetic mesh material, or any flexible sheet material which can be supplied in roll form and which is suitable for being coated to provide a wearing surface. However, hessian has proved to be a suitable base material for most uses and is preferred.

The thermoplastic material is preferably a paste of polyvinylchloride (P.V.C.) although other synthetic plastics materials capable of being cured by heat may be employed. Curing may be by infrared radiation.

The abrasive material is suitably aluminium oxide in small particle form. In practice a grain size of the order of 40 to 60 mesh has been found satisfactory. The thermoplastic material may also have applied to its upper surface before the paste constituting said upper surface is heat cured, silicon carbide in small particle or grit form. The silicon carbide grit is highly reflective of light and confers an attractive finish to the surface of the floor covering. Moreover, its addition provides a high percentage of abrasive material at the tread surface while, although it is abrasive, it is highly brittle and breaks through the thin skin of thermoplastic material which forms as a surface film during the heat curing operation.

The present invention further provides a method of manufacturing a floor covering which includes the steps:
 (a) Passing a backing material in sheet form under a doctor knife,
 (b) Mixing an abrasive substance in small particle form with a thermoplastic paste so that said paste is impregnated with said abrasive substance,
 (c) Applying the impregnated paste to said sheet of backing material ahead of the doctor knife whereby as the sheet is passed beneath said doctor knife the paste is levelled to constitute a coating of said sheet,
 (d) Heat curing the coated sheet,
 (e) Passing the cured coated sheet under an embossing roller to form small indentations in the upper surface of the sheet.

In practice where the backing material is hessian the thermoplastic paste must be of such viscosity that it does not pass through the hessian. However, a paste which has a viscosity so high that it does not pass through the hessian is too viscous to be levelled to a high quality of surface finish by a doctor knife. Accordingly it is preferred according to this invention that after curing the first applied coating and before embossing of the tread surface, the coated sheet has applied to it at least one further coating of thermoplastic paste impregnated with the abrasive material, said additional coating being of lower viscosity than the basic coating, so that it may be levelled to a greater degree of surface finish on being passed under the doctor knife. Immediately after passing the doctor knife each coating is heat cured and only when the final coating has been applied is the coated sheet passed under the embossing rollers.

When it is required to apply silicon carbide in particle form for the purposes explained above, this is sprinkled onto the finally applied coating before curing of the latter.

In a process according to one preferred embodiment of the invention, P.V.C. paste is prepared in standard type mixing equipment where it is pigmented to the required colour shade and then transferred to a change pan kneader type mixer for the incorporation of aluminium oxide abrasive grain. In practice a size 60 mesh grain has been found most satisfactory.

The change from a standard mixer to one in which the pan can be changed is due to the abrasive nature of the grit.

This P.V.C. paste now containing approximately 50% by weight of abrasive grain is applied onto a suitable base material such as hessian, levelled by a doctor knife and cured either by infrared or any other suitable means. A minimum of two coats is usually employed and built to the necessary thickness.

Immediately after the final coat has been applied silicon carbide grit is sprinkled over the uncured paste immediately prior to it entering the curing ovens. In practice a rather larger size grit than that used in the actual mix has been found most suitable. The purpose of this grit is to provide a high percentage of abrasive material near the surface of the flooring. This type of grit being more brittle than aluminium oxide readily breaks the thin skin of P.V.C. that tends to form as a surface film during the curing operation.

After the curing of the final coat the material is embossed with a suitably engraved roller to give a slightly irregular surface adding to the initial non-slip characteristics of the flooring and more readily permitting the grit to penetrate through the top skin. Once this has occurred the very hard aluminium oxide, well bonded to the mass of P.V.C. is sufficiently exposed to give a flooring with non-slip properties.

A standard engraving or embossing roll has a bearing surface constituted by a copper shell. However, it has been found that due to the abrasive nature of the impregnants, copper shells are quickly worn. A roll of hard steel would be effective and durable but expensive and it has been found that excellent results are achieved if the embossing roll is of relatively cheap mild steel to which a finish of chrome steel has been applied by the electrolytic process.

I claim:

1. A method of manufacturing a floor covering which includes the steps of:
   (a) passing a backing material in sheet form under a doctor knife,
   (b) mixing aluminium oxide in small particle form with a thermoplastic paste having a first viscosity so that said paste is impregnated with said abrasive substance,
   (c) applying the impregnated paste to said sheet of backing material ahead of the doctor knife whereby as said sheet is passed beneath said doctor knife, the paste is levelled to constitute a coating of said sheet, the viscosity of said paste substantially preventing said paste from passing through said backing material,
   (d) heat curing the coated sheet,
   (e) applying a further coating of an impregnated paste to the coated sheet, said further coating being of thermoplastic material having a viscosity lower than that of said first coating,
   (f) passing said sheet with said further coating applied beneath a doctor knife to level said further coating,
   (g) sprinkling silicon carbide grit onto said second applied coating,
   (h) heat curing said further coating, and then,
   (i) passing the cured coated sheet beneath an embossing roller to form small indentations in the surface of said second applied coating of said sheet.

2. A method of manufacturing a floor covering as in claim 1, wherein the aluminium oxide particles have a mesh size in the range of 40 to 60 mesh.

3. A floor covering comprising a flexible backing sheet, a first coating of thermoplastic material applied to said backing and having a first viscosity prior to curing so as to substantially prevent said coating from passing through said backing, said coating impregnated with aluminium oxide particles, a second coating of thermoplastic material having a viscosity lower than the viscosity of said first coating prior to curing impregnated with aluminium oxide particles and applied over said first coating, a layer of silicon carbide grit sprinkled onto said second coating prior to curing of said second coating, the surface of said second coating having a plurality of indentations embossed therein to define a protuberated surface.

4. A floor covering material as defined in the preceding claim 3, wherein the indentations have a depth of between 0.1 mm. and 0.3 mm., the maximum width of each indentation being at least equal to the depth of said indentation.

5. A floor covering material as defined in the preceding claim 3, wherein the surface indentations have a depth of between 0.15 mm. and 0.20 mm. inclusive, the impregnated thermoplastic coating having a thickness of between 2.5 mm. and 4.5 mm. with the maximum width of each indentation being at least three times its depth.

6. A floor covering according to claim 3 wherein the base material is hessian and wherein the abrasive substance is aluminium oxide in small particle form having a grain size of between 40 and 60 mesh.

References Cited

UNITED STATES PATENTS

| | | | |
|---|---|---|---|
| 2,543,777 | 3/1951 | Heasley | 156—279X |
| 2,780,533 | 2/1957 | Hurst | 156—279X |
| 2,811,906 | 11/1957 | Chappell | 156—279X |
| 3,030,251 | 4/1962 | LaBore et al. | 156—279X |
| 3,294,568 | 12/1966 | Grossmann | 117—8 |
| 3,433,700 | 3/1969 | Migdol et al. | 117—72X |
| 3,463,659 | 8/1969 | Dragoon et al. | 117—72X |

ALFRED L. LEAVITT, Primary Examiner

E. G. WHITBY, Assistant Examiner

U.S. Cl. X.R.

117—11, 28, 72, 123, 76, 127, 143, 155; 156—209; 161—116, 162, 208, 225